United States Patent
Behzadi (10) Patent No.: US 10,120,903 B2
(45) Date of Patent: Nov. 6, 2018

(54) IDENTIFYING TEACHABLE MOMENTS FOR CONTEXTUAL SEARCH

(71) Applicant: Google LLC, Mountain View, CA (US)

(72) Inventor: Behshad Behzadi, Zurich (CH)

(73) Assignee: Google LLC, Mountain View, CA (US)

(*) Notice: Subject to any disclaimer, the term of this patent is extended or adjusted under 35 U.S.C. 154(b) by 374 days.

(21) Appl. No.: 14/884,032

(22) Filed: Oct. 15, 2015

(65) Prior Publication Data
US 2016/0110420 A1    Apr. 21, 2016

Related U.S. Application Data

(60) Provisional application No. 62/064,236, filed on Oct. 15, 2014.

(51) Int. Cl.
G06F 17/30    (2006.01)

(52) U.S. Cl.
CPC .. *G06F 17/30477* (2013.01); *G06F 17/30554* (2013.01); *G06F 17/30867* (2013.01)

(58) Field of Classification Search
CPC ......... G06F 17/30867; G06F 17/30477; G06F 17/30554; G06F 17/3047
See application file for complete search history.

(56) References Cited

U.S. PATENT DOCUMENTS

| | | | | |
|---|---|---|---|---|
| 8,316,037 B1* | 11/2012 | Garg | ................ | G06F 17/30864 707/758 |
| 2010/0030734 A1* | 2/2010 | Chunilal | ........... | G06F 17/30867 707/770 |
| 2010/0138402 A1* | 6/2010 | Burroughs | ........ | G06F 17/30684 707/706 |
| 2011/0153528 A1* | 6/2011 | Bailey | ................... | G06Q 30/02 706/12 |
| 2011/0225155 A1* | 9/2011 | Roulland | ........... | G06F 17/30598 707/737 |
| 2013/0013580 A1* | 1/2013 | Geller | ............... | G06F 17/30672 707/706 |
| 2013/0275164 A1* | 10/2013 | Gruber | .................... | G10L 17/22 705/5 |
| 2013/0282709 A1* | 10/2013 | Zhu | ..................... | G06F 17/3064 707/728 |
| 2014/0258276 A1 | 9/2014 | Fredinburg et al. | | |
| 2014/0280292 A1* | 9/2014 | Skinder | ............. | G06F 17/30448 707/767 |

(Continued)

OTHER PUBLICATIONS

Liu et al., GOOSE: A Goal-Oriented Search Engine with Commonsense, AH202 Talk, pp. 1-40.*

(Continued)

*Primary Examiner* — Leslie Wong
(74) *Attorney, Agent, or Firm* — Fish & Richardson P.C.

(57) ABSTRACT

Methods, systems, and apparatus, including computer programs encoded on a computer storage medium, for receiving a series of queries provided from a user device, the series of queries including two or more queries, obtaining a query pattern of the series of queries based on one or more entities and one or more aspects associated with the two or more queries, and determining, at least partially based on the query pattern, that a teachable moment interface is to be displayed with search results, and in response, transmitting content to be displayed in the teachable moment interface on a computing device.

21 Claims, 4 Drawing Sheets

(56) References Cited

U.S. PATENT DOCUMENTS

| | | | | |
|---|---|---|---|---|
| 2014/0380286 | A1* | 12/2014 | Gabel | G06F 8/20 |
| | | | | 717/139 |
| 2015/0046435 | A1* | 2/2015 | Donneau-Golencer | ................... |
| | | | | G06F 17/3053 |
| | | | | 707/722 |
| 2015/0213040 | A1* | 7/2015 | Whitelaw | G06F 17/3053 |
| | | | | 707/728 |
| 2015/0370787 | A1* | 12/2015 | Akbacak | G06F 17/2836 |
| | | | | 704/2 |

OTHER PUBLICATIONS

International Preliminary Report on Patentability in International Application No. PCT.US2015/055661, dated Apr. 18, 2017, 8 pages.
Hollink et al., "Web usage mining with semantic analysis," World Wide Web, International World Wide Web Conferences Steering Committee, Republic and Canton of Geneva Switzerland, May 13, 2013, pp. 561-570.
International Search Report and Written Opinion in International Application No. PCT/US2015/055661, dated Jan. 7, 2016, 13 pages.

* cited by examiner

IDENTIFYING TEACHABLE MOMENTS FOR CONTEXTUAL SEARCH

CROSS-REFERENCE TO RELATED APPLICATIONS

This nonprovisional patent application claims the benefit of priority to U.S. Provisional Application No. 62/064,236, filed on Oct. 15, 2014, the disclosure of which is expressly incorporated herein by reference in its entirety.

BACKGROUND

The Internet provides access to a wide variety of resources, such as image files, audio files, video files, and web pages. A search system can identify resources in response to queries submitted by users and provide information about the resources in a manner that is useful to the users. The users can navigate through, e.g., select, search results to acquire information of interest.

SUMMARY

This specification relates to assisting users in interactions with computer-implemented information retrieval systems.

Implementations of the present disclosure are generally directed to selectively surfacing a user interface for assisting a user in search. More particularly, implementations of the present disclosure are directed to selectively displaying a teachable moment interface based on a series of queries, the teachable moment interface including content that promotes efficient interaction with a search system.

In general, innovative aspects of the subject matter described in this specification can be embodied in methods that include actions of receiving a series of queries provided from a user device, the series of queries including two or more queries, obtaining a query pattern of the series of queries based on one or more entities and one or more aspects associated with the two or more queries, and determining, at least partially based on the query pattern, that a teachable moment interface is to be displayed with search results, and in response, transmitting content to be displayed in the teachable moment interface on a computing device. Other implementations of this aspect include corresponding systems, apparatus, and computer programs, configured to perform the actions of the methods, encoded on computer storage devices.

These and other implementations can each optionally include one or more of the following features: determining that a teachable moment interface is to be displayed with search results includes determining that the query pattern is associated with an indication that a teachable moment interface can be displayed; determining that a teachable moment interface is to be displayed with search results includes determining that a number of times that a teachable moment interface has been displayed to a user is less than a threshold number of times; the user submitted the two or more queries in the series of queries using the computing device; obtaining a query pattern includes, for each query in the series of queries: obtaining a set of entities including one or more entities and obtaining a set of aspects including one or more aspects, comparing sets of entities across queries in the series of queries, and comparing sets of aspects across queries in the series of queries; the search results are responsive to a query in the series of queries; the content suggests one or more queries for improved interaction between the user and a search system, to which the two or more queries are submitted; and the content is specific to one or more of the query pattern and terms of the two or more queries in the series of queries.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Implementations of the present disclosure are generally directed to selectively surfacing a user interface for assisting a user in search. More particularly, implementations of the present disclosure are directed to recognizing a query pattern in a sequence of queries submitted to a search system by a user, determining that the query pattern corresponds to a teachable moment, and in response, selectively transmitting instructions to display a teachable moment interface. In some examples, a teachable moment is provided as an opportunity to assist a user in interacting with a search system to promote efficient operation of the search system. In some implementations, the teachable moment interface provides content to assist the user in interacting with the search system. In some examples, the query pattern is one of a plurality of query patterns. In some examples, content displayed in the teachable moment interface is selected based on the query pattern.

Figure 1:
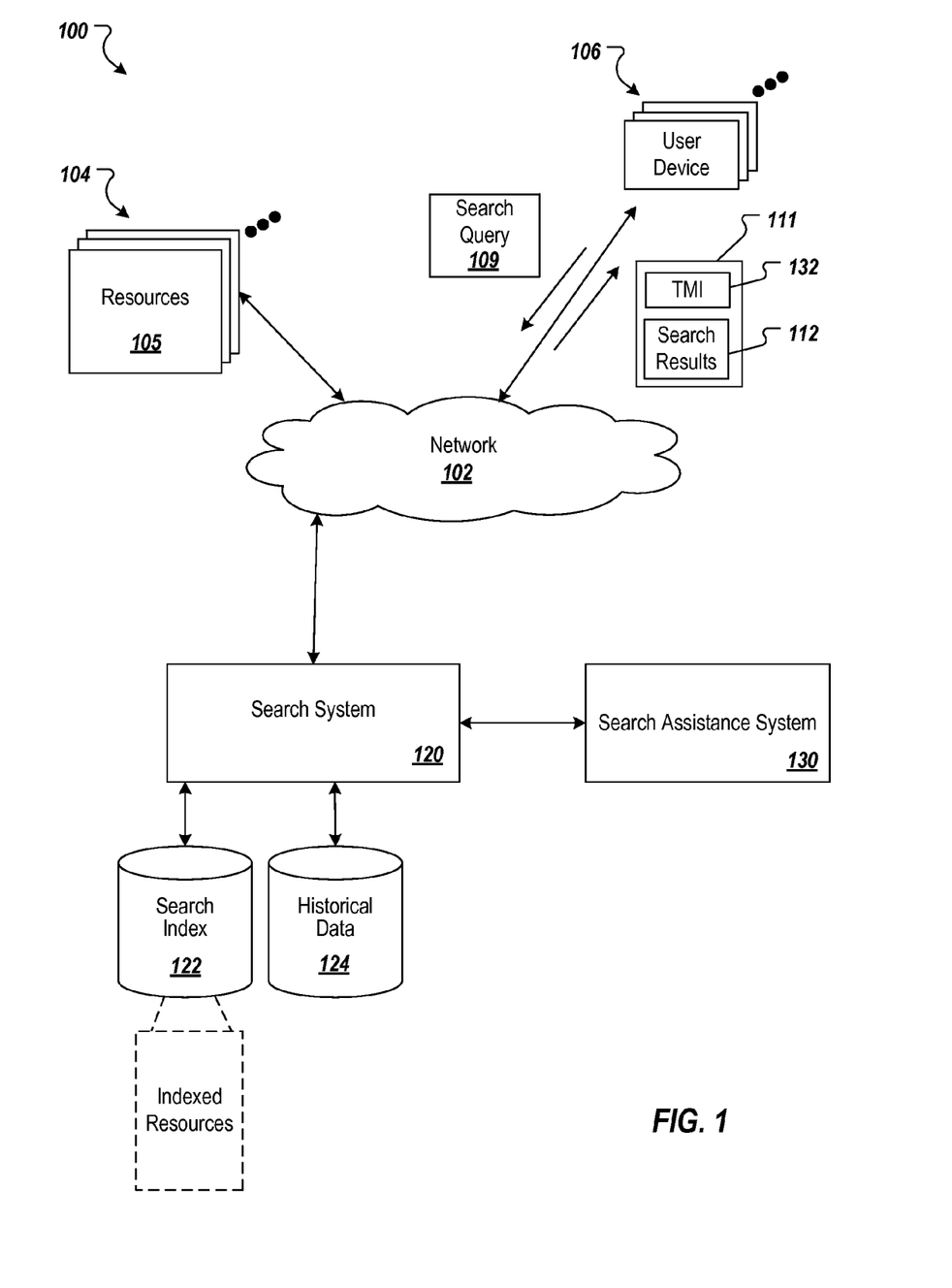
FIG. 1 depicts an example environment in which a search system provides search results based on interpreted user queries.

FIG. 1 depicts an example environment 100 in which a search system provides search results based on user queries. In some examples, the example environment 100 enables users to interact with one or more computer-implemented services. Example computer-implemented services can include a search service, an electronic mail service, a chat service, a document sharing service, a calendar sharing service, a photo sharing service, a video sharing service, blogging service, a micro-blogging service, a social networking service, a location (location-aware) service, a check-in service and a ratings and review service. In the example of FIG. 1, a search system 120 is depicted, which provides a search service, as described in further detail herein.

With continued reference to FIG. 1, the example environment 100 includes a network 102, e.g., a local area network (LAN), wide area network (WAN), the Internet, or a combination thereof, connects web sites 104, user devices 106, and the search system 120. In some examples, the network 102 can be accessed over a wired and/or a wireless communications link. For example, mobile computing devices, such as smartphones can utilize a cellular network to access the network 102. The environment 100 may include millions of web sites 104 and user devices 106.

In some examples, a web site 104 is provided as one or more resources 105 associated with a domain name and hosted by one or more servers. An example web site is a collection of web pages formatted in an appropriate machine-readable language, e.g., hypertext markup language (HTML), that can contain text, images, multimedia content, and programming elements, e.g., scripts. Each web site 104 is maintained by a publisher, e.g., an entity that manages and/or owns the web site.

In some examples, a resource 105 is data provided over the network 102 and that is associated with a resource address, e.g., a uniform resource locator (URL). In some examples, resources 105 that can be provided by a web site 104 include web pages, word processing documents, and portable document format (PDF) documents, images, video, and feed sources, among other appropriate digital content. The resources 105 can include content, e.g., words, phrases, images and sounds and may include embedded information, e.g., meta information and hyperlinks, and/or embedded instructions, e.g., scripts.

In some examples, a user device 106 is an electronic device that is capable of requesting and receiving resources 105 over the network 102. Example user devices 106 include personal computers, laptop computers, and mobile computing devices, e.g., smartphones and/or tablet computing devices, that can send and receive data over the network 102. As used throughout this document, the term mobile computing device ("mobile device") refers to a user device that is configured to communicate over a mobile communications network. A smartphone, e.g., a phone that is enabled to communicate over the Internet, is an example of a mobile device. A user device 106 can execute a user application, e.g., a web browser, to facilitate the sending and receiving of data over the network 102.

In some examples, to facilitate searching of resources 105, the search system 120 identifies the resources 105 by crawling and indexing the resources 105 provided on web sites 104. Data about the resources 105 can be indexed based on the resource to which the data corresponds. The indexed and, optionally, cached copies of the resources 105 are stored in a search index 122.

The user devices 106 submit search queries 109 to the search system 120. In some examples, a user device 106 can include one or more input modalities. Example modalities can include a keyboard, a touchscreen and/or a microphone. For example, a user can use a keyboard and/or touchscreen to type in a search query. As another example, a user can speak a search query, the user speech being captured through a microphone, and being processed through speech recognition to provide the search query.

In response to receiving a search query 109, the search system 120 accesses the search index 122 to identify resources 105 that are relevant to, e.g., have at least a minimum specified relevance score for, the search query 109. The search system 120 identifies the resources 105, generates a search results display 111 that includes search results 112 representing resources 105, and returns the search results display 111 to the user devices 106. In an example context, a search results display can include one or more web pages, e.g., one or more search results pages. In some examples, a web page can be provided based on a web document that can be written in any appropriate machine-readable language. It is contemplated, however, that implementations of the present disclosure can include other appropriate display types. For example, the search results can be provided in a display generated by an application that is executed on a computing device, and/or a display generated by an operating system, e.g., mobile operating system. In some examples, search results can be provided based on any appropriate form, e.g., Javascript-html, plaintext.

A search result 112 is data generated by the search system 120 that identifies a resource 105 that is responsive to a particular search query, and includes a link to the resource 105. An example search result 112 can include a web page title, a snippet of text or a portion of an image extracted from the web page, and the URL of the web page. In some examples, data provided in the search results 112 can be retrieved from a resource data store. For example, the search system 120 can provide the search results display 111, which displays the search results 112. In some examples, the search results display 111 can be populated with information, e.g., a web page title, a snippet of text or a portion of an image extracted from the web page, that is provided from the resource data store.

In some examples, data for the search queries 109 submitted during user sessions are stored in a data store, such as the historical data store 124. For example, the search system 120 can store received search queries in the historical data store 124.

In some examples, selection data specifying actions taken in response to search results 112 provided in response to each search query 109 are also stored in the historical data store 124, for example, by the search system 120. These actions can include whether a search result 112 was selected, e.g., clicked or hovered over with a pointer. The selection data can also include, for each selection of a search result 112, data identifying the search query 109 for which the search result 112 was provided.

In accordance with implementations of the present disclosure, the example environment 100 also includes a search assistance system 130 communicably coupled to the search system 120, e.g., directly coupled or coupled over a network such as network 102. Although the search system 120 and the search assistance system 130 are depicted as separate systems in FIG. 1, it is contemplated that the search system 120 can include the search assistance system 130. In some implementations, the search assistance system 130 identifies opportunities to assist users in interacting with the search system 120 based on queries received from the users. In some examples, and as described in further detail herein, the search assistance system 130 can trigger a user interface, referred to herein as a teachable moment interface 132, which can be displayed in the search results display 111. In some examples, the teachable moment interface 132 informs a user of a manner, in which to interact with the search system 120 to improve the efficiency of the information retrieval process. For example, the teachable moment interface 132 can include content that is based on one or more queries recently submitted by a user, and that informs the user of a more efficient manner to submit queries to the search system 120.

Search queries can be provided in one or more input modalities. Example input modalities include voice input and tactile input. For example, a user can speak a query, which speech can be detected by a user device 106, e.g., a microphone of the user device, and can be converted into text, e.g., by a speech-to-text program executed by the user device. Consequently, a spoken query can be converted to a textual query that is submitted to the search system 120. As another example, a user can type in a query, e.g., to the user device 106, which is a textual query that is submitted to the search system 120.

Implementations of the present disclosure are generally directed to selectively surfacing a user interface, a teachable moment interface, for assisting a user in search. More particularly, implementations of the present disclosure are directed to recognizing a query pattern in a sequence of queries submitted to a search system by a user, determining that the query pattern indicates a teachable moment, and at least partially in response, transmitting instructions to display a teachable moment interface. In some examples, a teachable moment is provided as an opportunity to assist a user in interacting with a search system to promote efficient operation of the search system. For example, a teachable moment can include an opportunity, during a query session, to provide instructive feedback to the user based on queries submitted by the user during the query session. In some implementations, the teachable moment interface provides content to assist the user in interacting with the search system. In some examples, the query pattern is one of a plurality of query patterns. In some examples, content displayed in the teachable moment interface is selected based on the query pattern.

In some implementations, a user interacting with a search system submits a sequence of queries in an effort to retrieve particular information. In some examples, the user submits one or more queries during a query session. For example, the user can submit a first query, and in response, the search system can provide first search results. The user can review the first search results and determine that the first search results do not include the particular information, or that other information is now desired. Consequently, the user can submit a second query in an effort to, for example, refine the first query to retrieve the particular information. In response to the second query, the search system can provide second search results. The user can review the second search results. In some examples, the user can determine that the second search results do not include the particular information, or that other information is now desired. Consequently, the user can continue the process by submitting a third query, e.g., as a refinement of the first query and/or the second query.

In accordance with implementations of the present disclosure, a series of queries can include a query pattern of a plurality of query patterns. Referring to the example above, an example series of queries can include the first query, the second query, and the third query. In some examples, queries in the series of queries are submitted in sequence, e.g., one after the other during the query session.

In some implementations, a query pattern is based on one or more entities associated with queries in the series of queries. For example, a query can be associated with an entity. As another example, a query can be associated with a plurality of entities. For example, a query can include one or more terms, e.g., words, phrases, and at least one term can correspond to an entity. In some examples, an entity can include a person, place, country, landmark, animal, historical event, organization, business, sports team, sporting event, movie, song, album, game, work of art, or any other appropriate entity.

In some examples, one or more terms of a query is provided to an entity annotator that selects one or more entities from an entity graph, and the one or more entities are included in the set of entities associated with the query. In some examples, a plurality of entities and information associated therewith can be stored as structured data in the entity graph. In some examples, an entity graph includes a plurality of nodes and edges between nodes. In some examples, a node represents an entity and an edge represents a relationship between entities. In some examples, the entity graph can be provided based on an example schema that structures data based on domains, types and properties. In some examples, a domain includes one or more types that share a namespace. In some examples, a namespace is provided as a directory of uniquely named objects, where each object in the namespace has a unique name, e.g., identifier. In some examples, a type denotes an "is a" relationship about a topic, and is used to hold a collection of properties. In some examples, a topic represents an entity, such as a person, place or thing. In some examples, each topic can have one or more types associated therewith. In some examples, a property is associated with a topic and defines a "has a" relationship between the topic and a value of the property. In some examples, the value of the property can include another topic. In some examples, an entity can be associated with a unique identifier within the entity graph. For example, the entity Alcatraz Island can be assigned the identifier /m/0h594.

In some implementations, a plurality of entities can be provided in one or more databases. For example, a plurality of entities can be provided in a table that can provide data associated with each entity. Example data can include a name of the entity, a location of the entity, one or more types assigned to the entity, one or more ratings associated with the entity, a set of entity query patterns associated with the entity, and any other appropriate information that can be provided for the entity. In some examples, an entity can be associated with a unique identifier within the one or more databases. For example, the entity Alcatraz Island can be assigned the identifier /m/0h594.

In some implementations, the query can include a term that is associated with an entity, e.g., an entity term, and a term that is not associated with an entity, e.g., a non-entity term. In some examples, an entity term can be associated with a primary entity and one or more secondary entities. In some examples, a primary entity includes an entity that the query is primarily about, and a secondary entity includes an entity that the query is secondarily about. In the example query [obama white house], a primary entity can include "Barrack Obama," and secondary entities can include "President of the United States," and "White House."

In some examples, a query pattern can reflect a consistency of entity terms and/or non-entity terms within a series of queries. In some examples, a non-entity term is referred to as an aspect. An example query pattern can include a primary entity and/or a secondary entity being associated with each query in a series of queries. That is, for example, in the series of queries, an entity term associated with a primary entity and/or an entity term associated with a secondary entity are included in each query of the series of queries. In some examples, an example query pattern can include one or more non-entity terms changing within the series of queries. That is, for example, in the series of queries, a non-entity term is only included in one query.

An example series of queries can include [obama white house], [obama white house speech], and [obama white house speech today]. In this example series of queries, entity terms can include "obama," associated with the primary entity "Barrack Obama" and the secondary entity "President of the United States," and "white house," associated with the secondary entity "White House." In this example series of queries, non-entity terms can include "speech" and "today." In this example, the query pattern can include the primary entity and the secondary entities being consistent within the series of queries, e.g., associated with each query of the series of queries, and the non-entity terms being inconsistent within the series of queries.

Another example series of queries can include [obama white house speeches], [bush white house speeches], and

[reagan white house speeches]. In this example series of queries, entity terms can include "obama," "bush," and "reagan" respectively associated with the primary entity "Barrack Obama," the primary entity "George W. Bush," the primary entity "George H. W. Bush," the primary entity "Ronald Reagan," and the secondary entity "President of the United States," and "white house," associated with the secondary entity "White House." In this example series of queries, a non-entity term can include "speeches." In this example, the query pattern can include the primary entity being inconsistent within the series of queries, and the non-entity term(s) being consistent within the series of queries.

As introduced above, a query pattern can be recognized for a series of queries. For example, as queries of a series of queries are received, entity terms and/or non-entity terms can be reviewed for consistency. In response to the presence or lack of consistency, a query pattern can be recognized within the series of queries from a plurality of query patterns. In some implementations, and in response to recognizing the query pattern, a teachable moment interface can be displayed to the user. In some examples, the teachable moment interface includes content that assists the user in more efficiently interacting with the search system.

In some implementations, a query pattern can indicate a teachable moment that would promote efficient interaction with and operation of a search system. In some examples, each query pattern of a plurality of query patterns can be associated with an indication of whether the query pattern corresponds to a teachable moment. That is, for example, some query patterns can be associated with teachable moments, and some query patterns are not associated with teachable moments.

In some implementations, a query pattern includes respective characteristics. Example characteristics can include a length of queries, consistency (or lack of consistency) of aspects across queries in a series of queries, and consistency (or lack of consistency) of aspects across queries in a series of queries. In some examples, an indication can be provided for each query pattern, which indicates whether the respective query pattern is associated with a teachable moment.

As one example, a first query patterns includes relatively long, similar queries in a series that indicate the same entit[y/ies]. The first query pattern can be indicated as corresponding to a teachable moment. That is, for a series of queries reflecting the first query pattern, a teachable moment interface can be provided. An example series of queries reflecting the first query pattern can include:
[who hosted the world cup in 1990]
[who hosted the world cup in 1994]
[who hosted the world cup in 1998]
This example series of queries include the same number of characters, e.g., X, which can be determined to exceed a threshold number of characters, e.g., Y. Consequently, it can be determined that the query pattern of this series is relatively long, e.g., exceeds Y. It can also be determined that this series of queries is about the same aspect, e.g., hosts of the world cup, and that an entity, e.g., world cup, is consistent across the queries. In view of at least these characteristics, it can be determined that this example series of queries reflects the first query pattern.

As another example, a second query pattern includes relatively long, different queries in a series that indicate the same entit[y/ies], but different aspects of the entity. The second query pattern can be indicated as corresponding to a teachable moment. That is, for a series of queries reflecting the second query pattern, a teachable moment interface can be provided. An example series of queries reflecting the second query pattern can include:
[how tall is the empire state building]
[when was the empire state building built]
[what restaurants are near the empire state building]
This example series of queries includes different numbers of characters, e.g., Q, R, S, respectively, each of which can be determined to exceed the threshold number of characters, e.g., Y. Consequently, it can be determined that the query pattern of this series is relatively long, e.g., exceeds Y. It can also be determined that this series of queries is about different aspects, e.g., how tall, when built, what restaurants, and that an entity, e.g., empire state building, is consistent across the queries. In view of at least these characteristics, it can be determined that this example series of queries reflects the second query pattern.

As another example, a third query pattern includes relatively short, similar queries in a series that indicate the different entities. The third query pattern can be indicated as not corresponding to a teachable moment. That is, for a series of queries reflecting the third query pattern, a teachable moment interface is not to be provided. An example series of queries reflecting the third query pattern can include:
[dog pictures]
[cat pictures]
[fox pictures]
This example series of queries includes the same number of characters, e.g., T, which can be determined not to exceed the threshold number of characters, e.g., Y. Consequently, it can be determined that the query pattern of this series is relatively short, e.g., not exceeding Y. It can also be determined that this series of queries is about the same aspect, e.g., pictures, and that an entity is inconsistent across the queries, e.g., dog, cat, fox. In view of at least these characteristics, it can be determined that of this example series of queries reflects the third query pattern.

In some implementations, even if the series of queries indicates a teachable moment, it is still determined whether a teachable moment interface is to be displayed to the user. For example, it can be determined whether display of a teachable moment interface for a particular series of queries would be helpful to assist the user in submission of subsequent search queries. In some examples, display of a teachable moment interface may be forgone, even though a teachable moment interface could be triggered in response to the series of queries.

In one example, a number of times that a teachable moment interface has been displayed to the user can be determined, and, if the number of times exceeds a threshold number, it is determined that the teachable moment interface is not to be displayed. In some examples, the number of times can be relative to a particular period of time. For example, a number of times that a teachable moment interface has been displayed to the user within a particular period of time, e.g., within the last 24 hours, can be determined, and, if the number of times within the particular period of time exceeds a threshold number, it is determined that the teachable moment interface is not to be displayed. In this manner, annoying the user with teachable moment interfaces can be avoided.

In another example, it can be determined whether the teachable moment for the particular query pattern has been previously presented to the user. For example, if a teachable moment interface associated with a particular query pattern has already been displayed at least once to the user, the teachable moment interface for the particular query pattern is not again displayed to the user. In some examples, the number of times that the teachable moment interface associated with the particular query pattern has already been displayed to the user is determined, and if the number of times exceeds a threshold number it is determined that the teachable moment interface for the particular query pattern is not to be displayed. In some examples, the number of times can be relative to a particular period of time. For example, a number of times that a teachable moment interface for the particular query pattern has been displayed to the user within a particular period of time, e.g., within the last 24 hours, can be determined, and, if the number of times within the particular period of time exceeds a threshold number, it is determined that the teachable moment interface for the particular query pattern is not to be displayed. In this manner, annoying the user with teachable moment interfaces for the same query pattern can be avoided.

In some implementations, and as introduced above, a teachable moment interface provides content to assist the user in interacting with the search system. In some examples, the content instructions the user on how to submit shorter queries in a series of queries. As one example, the following example series of queries, introduced above, can be considered:

[who hosted the world cup in 1990]
[who hosted the world cup in 1994]
[who hosted the world cup in 1998]

In response to this example series of queries, a teachable moment interface can be displayed to the user and can inform the user that, after the first query, subsequent queries can be truncated. For example, the teachable moment interface can inform the user that the search system can determine a context for subsequent queries based on the first query and/or the second query, and that the user need not include the context in a subsequent query. For example, the user can be taught that, instead of the example series of queries above, the user can submit:

[who hosted the world cup in 1990]
[in 1994]
[in 1998]

As another example, the following example series of queries, introduced above, can be considered:

[how tall is the empire state building]
[when was the empire state building built]
[what restaurants are near the empire state building]

In response to this example series of queries, a teachable moment interface can be displayed to the user and can inform the user that, after the first query, subsequent queries can be truncated. For example, the teachable moment interface can inform the user that the search system can determine a context for subsequent queries based on the first query and/or the second query, and that the user need not include the context in a subsequent query. For example, the user can be taught that, instead of the example series of queries above, the user can submit:

[how tall is the empire state building]
[when was it built]
[what restaurants are nearby]

Accordingly, implementations of the present disclosure teach and promote a more conversational and efficient interaction with search systems. In this manner, series of queries can be truncated, which promotes efficient operation of search systems and efficient communication between user devices and search systems, as described in further detail herein.

As another example, the following example series of queries, introduced above, can be considered:

[dog pictures]
[cat pictures]
[fox pictures]

In response to this example series of queries, a teachable moment interface is not displayed to the user. More particularly, because the queries in the series are relatively short and are about the same aspect, e.g., pictures, even though of different entities, e.g., dog, cat, fox, the example series of queries does not represent a teachable moment that could promote a more conversational and efficient interaction with search systems.

Figure 2:
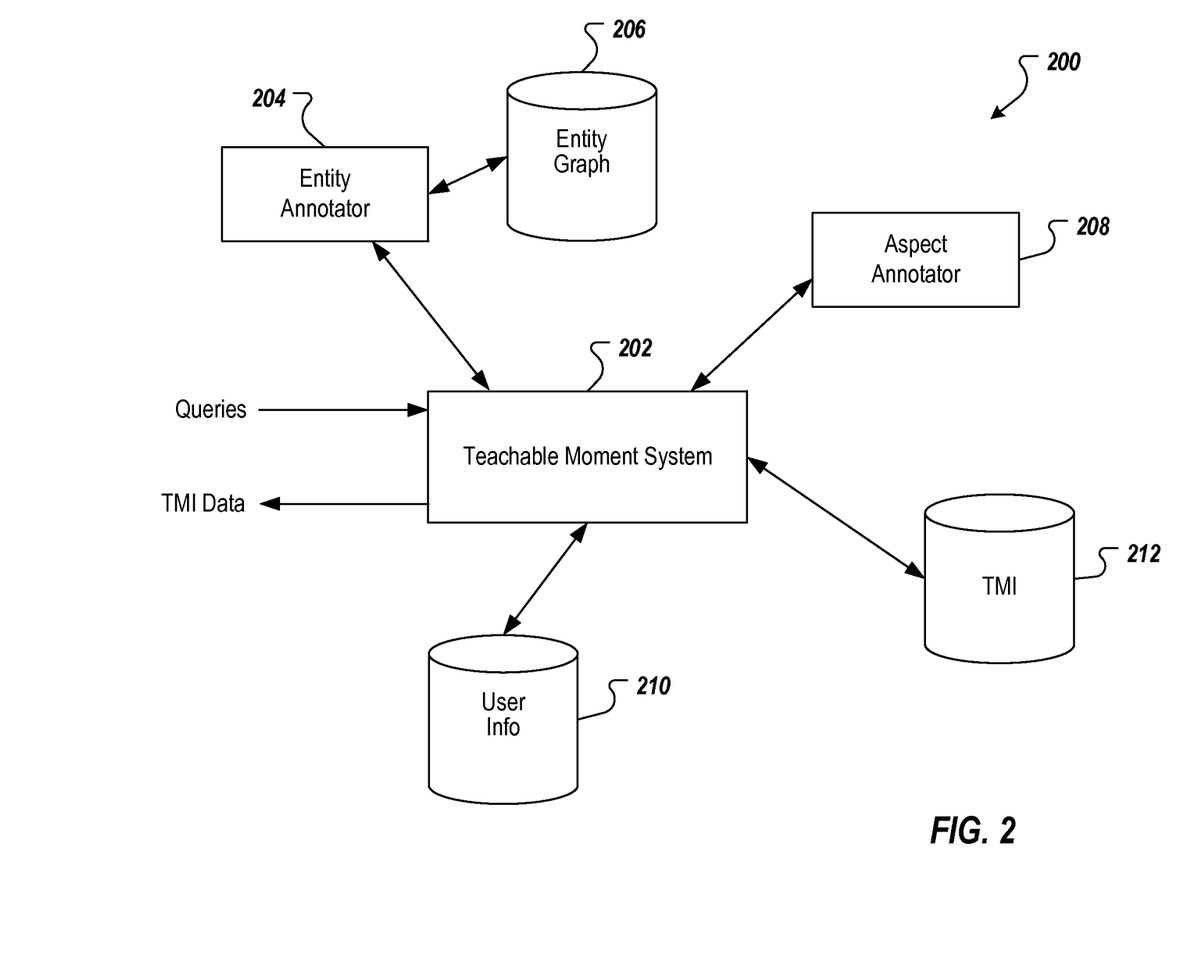
FIG. 2 depicts an example system that can be used to realize implementations of the present disclosure.

FIG. 2 depicts an example system 200 that can be used to realize implementations of the present disclosure. In the depicted example, the example system 200 includes a teachable moment system 202, an entity annotator 204, an entity graph 206, an aspect annotator 208, user information database 210, and a teachable moment interface database 212. In some examples, each of the teachable moment system 202, the entity annotator 204, and the aspect annotator 208 is provided as one or more computer-executable programs executed using one or more computing devices, e.g., one or more servers. In some examples, the teachable moment system 202 is provided as one or more components of the search system 120 and/or the search assistance system 130 of FIG. 1.

In some implementations, the teachable moment system 202 receives a series of queries $[Q_1, \ldots, Q_n]$ and processes the queries to determine whether a teachable moment interface is to be displayed to a user, who submitted the queries. In some examples, if a teachable moment interface is to be displayed, the teachable moment system 202 provides teachable moment interface data, e.g., to the search system 120, to a user device 106. In some examples, user information is provided with the queries. For example, an identifier that uniquely identifies the user, who submitted the queries can be provided.

In some implementations, the teachable moment system 202 processes each query to provide a set of entities (E) for each query, a set of aspects (A) for each query, and a length (L) of each query. In some examples, a set of entities includes zero or more entities associated with the respective query, a set of aspects includes zero or more aspects associated with the respective query, and a length includes a number of characters in the respective query. In some implementations, the teachable moment system 202 provides the queries to the entity annotator 204, which process the queries and provides a respective set of entities for each query, e.g., based on the entity graph 206. In some implementations, the teachable moment system 202 provides the queries to the aspect annotator 208, which process the queries and provides a respective set of aspects for each query. In some examples, for queries in the series of queries $[Q_1, \ldots, Q_n]$, the teachable moment system 202 can provide:

$$Q_1: \{E_1, \ldots E_m\}_1; \{A_1, \ldots A_p\}_1, L_1$$

$$\ldots$$

$$Q_n: \{E_1, \ldots E_m\}_n; \{A_1, \ldots A_p\}_n, L_n$$

In some implementations, the teachable moment system 202 can compare information across the queries to determine a query pattern for the series of queries. For example, the teachable moment system 202 can compare the set of entities $\{E_1, \ldots E_m\}_1$ to the set of entities $\{E_1, \ldots E_m\}_n$ to determine whether entities are consistent across the queries, e.g., the queries have one or more entities in common, or whether entities are inconsistent across the queries, e.g., the queries have no entities in common. As another example, the teachable moment system 202 can compare the set of aspects $\{A_1, \ldots A_p\}_1$ to the set of aspects $\{A_1, \ldots A_p\}_n$ to determine whether aspects are consistent across the queries, e.g., the queries have one or more aspects in common, or whether aspects are inconsistent across the queries, e.g., the queries have no aspects in common.

In some implementations, the teachable moment system 202 can determine a query pattern of the series of queries from a plurality of query patterns based on consistency (or inconsistency) of entities and/or aspects of the queries, and/or the lengths of the queries. For example, the teachable moment system 202 can determine whether the series of queries corresponds to a query pattern including relatively long, similar queries that indicate the same entit[y/ies], e.g., the first query pattern described above. As another example, the teachable moment system 202 can determine whether the series of queries corresponds to a query pattern including relatively long, different queries that indicate the same entit[y/ies], but different aspects of the entity, e.g., the second query pattern described above. As another example, the teachable moment system 202 can determine whether the series of queries corresponds to a query pattern including relatively short, similar queries that indicate the different entities, e.g., the third query pattern described above.

In some examples, the teachable moment system 202 can determine whether a teachable moment interface can be displayed based on the identified query pattern. For example, for each query pattern in the plurality of query patterns, an indication can be provided, e.g., in a table of query patterns, as to whether a teachable moment interface can be displayed. Using the examples above, the first query pattern and the second query pattern can each include an indication that a teachable moment interface can be displayed, and the third query pattern can include an indication that a teachable moment interface is not to be displayed.

In some implementations, even if the query pattern indicates that a teachable moment interface can be displayed, the teachable moment system 202 determines whether a teachable moment interface will be displayed. In some examples, the teachable moment system 202 retrieves user information for the respective user, e.g., based on the unique identifier received with the queries. In some examples, the user information can include a number of times that a teachable moment interface has been displayed to the user for a particular query pattern, and times, at which respective teachable moment user interfaces were displayed to the user, if any. For example, the teachable moment system 202 can cross-reference a user table stored in the user information database 210 using the identifier and the query pattern to retrieve the relevant user information. In some examples, and as described above, it is determined not to display a teachable moment interface, if the number of times a teachable moment interface, e.g., for a particular query pattern, exceeds a threshold number, e.g., within a particular period of time.

In some implementations, if it is determined that a teachable moment interface is to be displayed, the teachable moment system 202 retrieves interface information from the teachable moment interface database 212. In some examples, the teachable moment system 202 uses the query pattern to index a table, and receives content that is to be displayed in the teachable moment interface. In some examples, the content is generic content, e.g., content that is displayed in teachable moment interfaces regardless of the query pattern, or content of the queries in the underlying series of queries. In some examples, the content is query pattern-specific content, e.g., content that is displayed in teachable moment interfaces for the particular query pattern regardless of the content of the queries in the underlying series of queries. In some examples, the content is series-specific content, e.g., content that is displayed in teachable moment interfaces for the particular query pattern and for the particular content of the queries in the underlying series of queries. Examples are described in further detail below.

In some implementations, the teachable moment system 202 transmits teachable moment data, e.g., to the search system 120, to the user device 106. In some examples, the teachable moment data includes content that is to be displayed in the teachable moment interface. In some examples, the search system 120 processes the teachable moment data to provide a search results display 111 that includes a teachable moment interface 132, as depicted in FIG. 1.

Figure 3:
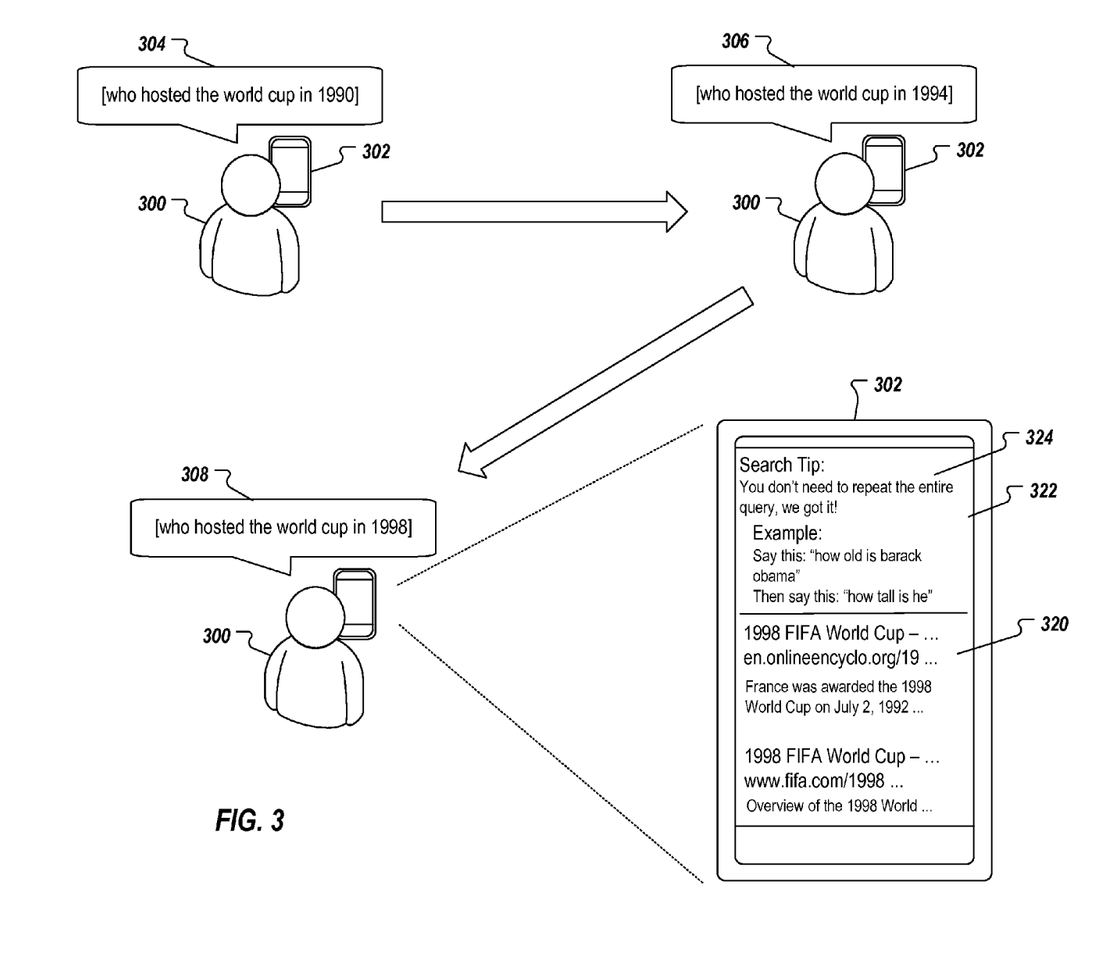
FIG. 3 depicts an example use case in accordance with implementations of the present disclosure.

FIG. 3 depicts an example use case in accordance with implementations of the present disclosure. In the examples use case, a user 300 interacts with a user device 302, e.g., mobile device, to submit a series of queries 304, 306, 308 to a search system, e.g., the search system 120 of FIG. 1. In the depicted example, the user 300 verbally inputs the queries 304, 306, 308 in a sequence and respective search results can be displayed to the user 300 on the user device 302. In response to the query 308, search results 320 are displayed, as well as a teachable moment interface 322. In the depicted example, the teachable moment interface 322 includes content 324 that instructs the user 300 on how to more efficiently interact with the search system 310 in subsequent querying. In the depicted example, the content 324 is provided as generic content, e.g. generic instructions on how to more efficiently interact with the search system. In some examples, content displayed in the teachable moment interface 322 can be specific to one or more queries in the series of queries that resulted in the teachable moment interface 322 being displayed. Example specific content, in view of the example queries 304, 306, 308, can be provided as:

Search Tip:
  You don't need to repeat the entire query, we got it!
  Example:
    Say this: "who hosted the world cup in 1990"
    Then say this "in 1994"
    Then say this "in 1998"

Figure 4:
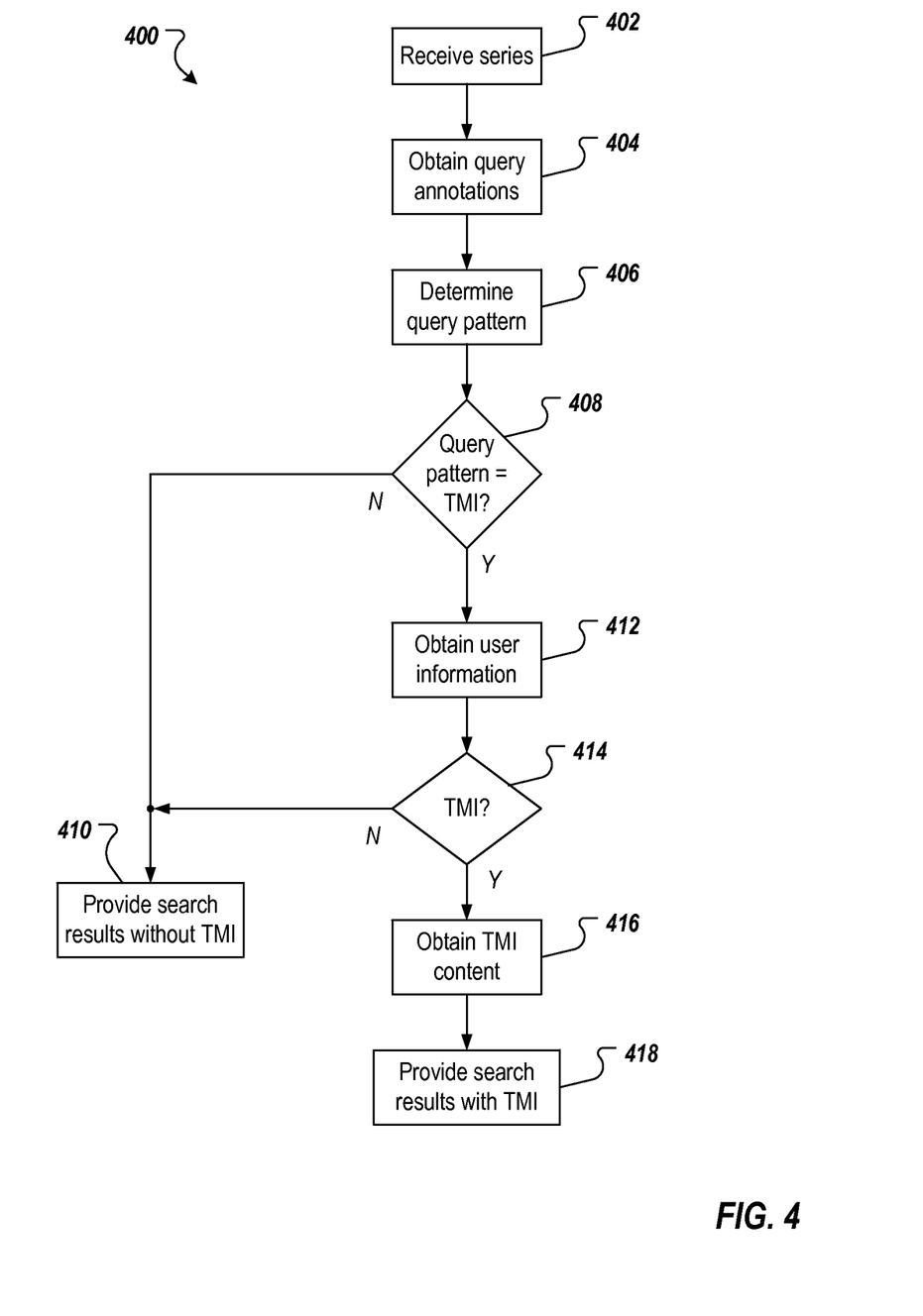
FIG. 4 depicts an example process that can be executed in accordance with implementations of the present disclosure.

FIG. 4 depicts an example process 400 that can be executed in accordance with implementations of the present disclosure. The example process 400 can be implemented, for example, by the example environment 100 of FIG. 1, e.g., the search system 120 and/or the search assistance system 130. In some examples, the example process 400 can be provided by one or more computer-executable programs executed using one or more computing devices.

A series of queries is received (402). For example, the teachable moment system 202 of FIG. 2 receives a series of queries, e.g., from the search system 120 of FIG. 1. Query annotations are obtained (404. For example, the teachable moment system 202 obtained query annotations from one or more sources, e.g., the entity annotator 204, the aspect annotator 208. In some examples, the teachable moment system annotates each query with a respective length, e.g., a number of characters in a respective query. A query pattern of the series of queries is determined (406). For example, the teachable moment system 202 compares annotations across queries, e.g., entities, aspects, to select a query pattern from a plurality of query patterns for the series of queries.

It is determined whether the query pattern indicates that a teachable moment interface can be displayed (408). For example, the query pattern is associated with an indication that a teachable moment is or is not to be displayed. If it is determined that a teachable moment interface is not to be displayed, search results are provided without a teachable moment interface (410). For example, the teachable moment system 202 can provide an indication to the search system 120 that no teachable moment interface is to be provided. Consequently, the search system 120 can provide search results to a user device, e.g., from which the series of queries is received. In some examples, the search results are responsive to the last (most recently received) query in the series of queries.

If it is determined that a teachable moment interface can be displayed, user information is obtained (412). For example, the teachable moment system 202 retrieves user information for a user (the user who submitted the series of queries) from the user information database 210. In some examples, the user information includes a number of times that a teachable moment interface has been displayed to the user for a particular query pattern, and times, at which respective teachable moment user interfaces were displayed to the user, if any. For example, the teachable moment system 202 can cross-reference a user table stored in the user information database 210 using the identifier and the query pattern to retrieve the relevant user information.

It is determined whether a teachable moment interface is to be displayed (414). For example, the teachable moment system 202 can determine whether a teachable moment interface is to be displayed, as described herein, e.g., how often a teachable moment interface has been displayed to the user. If a teachable moment interface is not to be displayed, search results are provided without a teachable moment interface (410). If a teachable moment interface is to be displayed, content for the teachable moment interface is obtained. For example, the teachable moment system 202 obtains content, as described herein. Search results are provided with the teachable moment interface (418). For example, the teachable moment system 202 transmits teachable moment data to the search system 120, which processes the teachable moment data to provide a search results display that includes the teachable moment interface. The search system 120 can provide search results to a user device, e.g., from which the series of queries is received. In some examples, the search results are responsive to the last (most recently received) query in the series of queries.

Implementations of the present disclosure identify opportunities to improve interaction between a user and a search system. In accordance with implementations of the present disclosure an opportunity to display a teachable moment interface is identified, and the teachable moment interface is selectively displayed to provide content that promotes efficient interaction between the user and the search system. In some examples, efficiencies are gained by promoting submission of simplified queries to the search system. For example, before experiencing a teachable moment, the user might submit the following series of queries: [who hosted the world cup in 1990], [who hosted the world cup in 1994], and [who hosted the world cup in 1998]. After experiencing a teachable moment, the user instead might submit the following series of queries: [who won the world cup in 1990], [in 1994], and [in 1998]. In this manner, thinner (simplified) queries, e.g., [in 1994], [in 1998], might be submitted instead of relatively thicker queries, e.g., [who won the world cup in 1994], [who won the world cup in 1998]. Accordingly, a reduced amount of content is submitted to and processed by the search system, which reduces the amount of resources, e.g., communication bandwidth, computer processing, memory, required to process the submitted queries. Using the examples above, by submitting the queries [in 1994] and [in 1998], ten (10) less words need be transmitted to and processed by the search system, as compared to the queries [who won the world cup in 1994] and [who won the world cup in 1998]. Further, in computing devices the use speech-to-text for translating spoken queries to textual queries, the amount of resources, e.g., computer processing, memory, required to process the spoken queries is reduced.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method executed by one or more processors, the method comprising:
receiving, by the one or more processors, a series of queries provided from a user device, the series of queries comprising two or more queries;
determining, by the one or more processors, a query pattern of the series of queries based on one or more entities and one or more aspects associated with the two or more queries, the determining comprising:
for each query in the series of queries:
determining a set of entities comprising one or more entities and described in the query, and
determining a set of aspects comprising one or more aspects and described in the query;
comparing sets of entities across queries in the series of queries;
comparing sets of aspects across queries in the series of queries;
determining that at least one of a set of aspects are consistent in each of the queries or a set of entities are consistent in each of the queries; and
determining that the at least one of a set of aspects that are consistent in each of the queries or a set of entities that are consistent in each of the queries is a context of the queries, and that the context defines the query pattern;
determining, by the one or more processors and at least partially based on the context defining the query pattern, that a teachable moment interface is to be displayed with search results on the user device; and
transmitting, by the one or more processors, content to be displayed in the teachable moment interface on the user device, the content including instructions to a user that instructs the user that the user need not include the content that defines the query pattern in queries that are subsequent to the series of queries.

2. The method of claim 1, wherein determining that a teachable moment interface is to be displayed with search results on the user device comprises determining that the query pattern is associated with an indication that a teachable moment interface can be displayed.

3. The method of claim 1, wherein determining that a teachable moment interface is to be displayed with search results on the user device comprises determining that a number of times that a teachable moment interface has been displayed to a user is less than a threshold number of times.

4. The method of claim 3, wherein the user submitted the two or more queries in the series of queries using the user device.

5. The method of claim 1, wherein the search results are responsive to a query in the series of queries.

6. The method of claim 1, wherein the content suggests one or more queries for improved interaction between the user and a search system, to which the two or more queries are submitted.

7. The method of claim 1, wherein the content is specific to one or more of the query pattern and terms of the two or more queries in the series of queries.

8. A system comprising:
a data store for storing data; and
one or more processors configured to interact with the data store, the one or more processors being further configured to perform operations comprising:
receiving a series of queries provided from a user device, the series of queries comprising two or more queries;
determining a query pattern of the series of queries based on one or more entities and one or more aspects associated with the two or more queries, the determining comprising:
for each query in the series of queries:
determining a set of entities comprising one or more entities and described in the query, and
determining a set of aspects comprising one or more aspects and described in the query;
comparing sets of entities across queries in the series of queries;
comparing sets of aspects across queries in the series of queries;
determining that at least one of a set of aspects are consistent in each of the queries or a set of entities are consistent in each of the queries; and
determining that the at least one of a set of aspects that are consistent in each of the queries or a set of entities that are consistent in each of the queries is a context of the queries, and that the context defines the query pattern;
determining, at least partially based on the context defining the query pattern, that a teachable moment interface is to be displayed with search results on the user device; and
transmitting content to be displayed in the teachable moment interface on a user device, the content including instructions to a user that instructs the user that the user need not include the content that defines the query pattern in queries that are subsequent to the series of queries.

9. The system of claim 8, wherein determining that a teachable moment interface is to be displayed with search results on the user device comprises determining that the query pattern is associated with an indication that a teachable moment interface can be displayed.

10. The system of claim 8, wherein determining that a teachable moment interface is to be displayed with search results on the user device comprises determining that a number of times that a teachable moment interface has been displayed to a user is less than a threshold number of times.

11. The system of claim 10, wherein the user submitted the two or more queries in the series of queries using the user device.

12. The system of claim 8, wherein the search results are responsive to a query in the series of queries.

13. The system of claim 8, wherein the content suggests one or more queries for improved interaction between the user and a search system, to which the two or more queries are submitted.

14. The system of claim 8, wherein the content is specific to one or more of the query pattern and terms of the two or more queries in the series of queries.

15. A non-transitory computer readable medium storing instructions that, when executed by one or more processors, cause the one or more processors to perform operations comprising:
receiving a series of queries provided from a user device, the series of queries comprising two or more queries;
determining a query pattern of the series of queries based on one or more entities and one or more aspects associated with the two or more queries, the determining comprising:
for each query in the series of queries:
determining a set of entities comprising one or more entities and described in the query, and determining a set of aspects comprising one or more aspects and described in the query;

comparing sets of entities across queries in the series of queries;

comparing sets of aspects across queries in the series of queries;

determining that at least one of a set of aspects are consistent in each of the queries or a set of entities are consistent in each of the queries; and determining that the at least one of a set of aspects that are consistent in each of the queries or a set of entities that are consistent in each of the queries is a context of the queries, and that the context defines the query pattern;

determining, at least partially based on the context defining the query pattern, that a teachable moment interface is to be displayed with search results on the user device; and transmitting content to be displayed in the teachable moment interface on the user device, the content including instructions to a user that instructs the user that the user need not include the content that defines the query pattern in queries that are subsequent to the series of queries.

16. The non-transitory computer readable medium of claim 15, wherein determining that a teachable moment interface is to be displayed with search results on the user device comprises determining that the query pattern is associated with an indication that a teachable moment interface can be displayed.

17. The non-transitory computer readable medium of claim 15, wherein determining that a teachable moment interface is to be displayed with search results on the user device comprises determining that a number of times that a teachable moment interface has been displayed to a user is less than a threshold number of times.

18. The non-transitory computer readable medium of claim 17, wherein the user submitted the two or more queries in the series of queries using the user device.

19. The non-transitory computer readable medium of claim 15, wherein the search results are responsive to a query in the series of queries.

20. The non-transitory computer readable medium of claim 15, wherein the content suggests one or more queries for improved interaction between the user and a search system, to which the two or more queries are submitted.

21. The non-transitory computer readable medium of claim 15, wherein the content is specific to one or more of the query pattern and terms of the two or more queries in the series of queries.

* * * * *

UNITED STATES PATENT AND TRADEMARK OFFICE
CERTIFICATE OF CORRECTION

Page 1 of 1

PATENT NO. : 10,120,903 B2
APPLICATION NO. : 14/884032
DATED : November 6, 2018
INVENTOR(S) : Behshad Behzadi

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 464 days.

Signed and Sealed this
Fourteenth Day of May, 2019

Andrei Iancu
*Director of the United States Patent and Trademark Office*